United States Patent
Pal et al.

[11] Patent Number: 5,397,478
[45] Date of Patent: Mar. 14, 1995

[54] FIXATION AND STABILIZATION OF CHROMIUM IN CONTAMINATED MATERIALS

[75] Inventors: Dhiraj Pal, Chicago Heights; Karl W. Yost, Crete, both of Ill.

[73] Assignee: Sevenson Environmental Services, Inc., Niagara Falls, N.Y.

[21] Appl. No.: 106,208

[22] Filed: Aug. 13, 1993

[51] Int. Cl.⁶ ............................................. C02F 1/62
[52] U.S. Cl. ............................ 210/710; 210/720; 210/724; 210/726; 210/751; 210/757; 210/913; 405/129; 423/55; 588/256
[58] Field of Search .............. 210/719, 720, 723, 724, 210/725, 726, 727, 751, 710, 913, 757; 405/128, 129; 423/55; 588/252, 256

[56] References Cited

U.S. PATENT DOCUMENTS

| | | | |
|---|---|---|---|
| 3,201,268 | 8/1965 | Hemwall | 106/68 |
| 3,837,872 | 9/1974 | Conner | 106/74 |
| 3,893,656 | 7/1975 | Opack et al. | 210/199 |
| 3,937,785 | 2/1976 | Gancy et al. | 423/53 |
| 3,969,246 | 7/1976 | Feltz et al. | 210/913 |
| 3,981,965 | 9/1976 | Gancy et al. | 423/55 |
| 4,012,320 | 3/1977 | Conner et al. | 210/713 |
| 4,116,705 | 9/1978 | Chappell | 106/90 |
| 4,122,048 | 10/1978 | Buchwalder et al. | 521/26 |
| 4,149,968 | 4/1979 | Kupiec et al. | 405/128 |
| 4,268,486 | 5/1981 | Noack et al. | 423/55 |
| 4,318,788 | 3/1982 | Duffey | 204/149 |
| 4,336,142 | 6/1982 | Bye | 210/724 |
| 4,379,763 | 4/1983 | Clemens et al. | 252/628 |
| 4,401,573 | 8/1983 | Perrone et al. | 210/724 |
| 4,432,666 | 2/1984 | Frey et al. | 405/129 |
| 4,443,133 | 4/1984 | Barrett | 405/263 |
| 4,446,026 | 5/1984 | Beutier et al. | 210/639 |
| 4,518,508 | 5/1985 | Conner | 210/751 |
| 4,530,765 | 7/1985 | Sabherwal | 210/663 |
| 4,629,509 | 12/1986 | O'Hara et al. | 106/118 |
| 4,652,381 | 3/1987 | Inglis | 210/724 |
| 4,671,882 | 6/1987 | Douglas et al. | 210/720 |
| 4,678,584 | 7/1987 | Elfline | 210/719 |
| 4,680,126 | 7/1987 | Frankard et al. | 210/710 |
| 4,684,472 | 8/1987 | Abbe et al. | 210/720 |
| 4,701,219 | 10/1987 | Bonee | 106/118 |
| 4,741,776 | 5/1988 | Bye et al. | 106/89 |
| 4,798,708 | 1/1989 | Ladd et al. | 423/55 |
| 4,853,208 | 8/1989 | Reimers et al. | 423/659 |
| 4,889,640 | 12/1989 | Stanforth | 210/751 |
| 4,935,146 | 6/1990 | O'Neill et al. | 210/684 |
| 4,950,409 | 8/1990 | Stanforth | 210/751 |
| 5,000,858 | 3/1991 | Manning et al. | 210/709 |
| 5,002,645 | 3/1991 | Eastland, Jr. et al. | 210/912 |
| 5,009,793 | 4/1991 | Muller | 210/724 |
| 5,037,479 | 8/1991 | Stanforth | 106/691 |
| 5,053,139 | 10/1991 | Dodwell et al. | 210/688 |
| 5,162,600 | 11/1992 | Cody et al. | 588/236 |
| 5,193,936 | 3/1993 | Pal et al. | 405/128 |
| 5,200,088 | 4/1993 | Pilznienski | 210/720 |

FOREIGN PATENT DOCUMENTS

| | | | |
|---|---|---|---|
| 47-25088 | 10/1972 | Japan | 210/913 |
| 2277594 | 11/1990 | Japan . | |
| 2254605 | 10/1992 | United Kingdom | 210/913 |
| 424816 | 9/1974 | U.S.S.R. | 210/913 |

OTHER PUBLICATIONS

Patterson, James W., "Industrial Wastewater Treatment Technology", (1985), pp. 53–90.

Page, A. L., "Methods of Soil Analysis, Part 2, Chemical and Microbiological Properties", (1982), pp. 337–346.

*Primary Examiner*—Peter A. Hruskoci
*Attorney, Agent, or Firm*—Kevin E. McDermott

[57] ABSTRACT

A highly flexible multi-step treatment technology for chemical fixation and stabilization of leachable chromium, particularly hexavalent chrome, in contaminated soils, solid wastes, concrete, sludge, sand and gravel and waste waters is disclosed. The process comprises reducing hexavalent chromium to chromous ($Cr^{2+}$) and chromic ($Cr^{3+}$) forms in the presence of water under alkaline conditions and fixing the reduced chromium forms with phosphate.

The process reduces Toxicity Characteristic Leaching Procedure chromium levels below the regulatory threshold of 5 mg/l as required by the USEPA.

15 Claims, No Drawings

FIXATION AND STABILIZATION OF CHROMIUM IN CONTAMINATED MATERIALS

The present invention is directed to a process for the fixation and stabilization of leachable and soluble chromium (chrome) in contaminated soil, solid wastes, waste waters and the waste products of industrial processes.

BACKGROUND OF THE INVENTION AND PRIOR ART

The growing concern for the protection of the environment has led federal, state and local governments to enact a series of laws and regulations placing strict standards on the permissible percentages of heavy metals in waste waters, solids and solid wastes. Prior to the enactment of these laws, industries that generated solid and liquid wastes containing heavy metals, such as chromium, were not regulated and they disposed of these waste materials with little or no regard for the environmental consequences. Chromium contaminated wastes are generated by several industries, including metal finishing or plating operations, mining operations, milling operations, tanneries and operations using bichromates for processing organic products. Careless handling of such chromium containing materials and wastes has in many cases led to the contamination of the soil in the vicinity of these facilities and elsewhere.

Chromium exists in various oxidation states ranging from valences of 2− to 6+. Hexavalent chrome has a 6+ valence state and forms divalent anions like $CrO_4^{2-}$ (Chromate) and $Cr_2O_7^{2-}$ (dichromate) under acidic conditions. Both chromate and dichromate anions are highly reactive and extremely mobile in soils and waste materials. Chromates and dichromates are strong oxidizing agents that are extremely toxic and hazardous to living organisms. For example, chromic acid and sodium chromates are used in laboratory for the oxidation of organics compounds. Therefore, hexavalent chromium that is discovered in soils or exists as an industrial waste material must be destroyed, contained and/or stabilized to reduce the risks to the environment caused by its rapid migration and highly toxic characteristics.

The Resource Conservation and Recovery Act of 1976, commonly known as the RCRA, provided for federal classification of hazardous waste. The statutory language defines "hazardous waste" as solid waste or combinations of solid waste which pose a "substantial present or potential hazard . . . when improperly treated, stored, transported, or disposed of, or otherwise mismanaged." Any solid waste that exhibits one of the hazard characteristics defined in subpart C of Part 261, Volume 40, Code of Federal Regulations is, by definition, a hazardous waste.

A solid waste is considered to be a hazardous waste if it is listed by the Environmental Protection Agency (EPA), or it exhibits characteristics of either ignitability, corrosivity, reactivity, or toxicity as determined by the Toxicity Characteristic Leaching Procedure (TCLP) (USEPA Method 1311). Historically, toxicity characteristic regulations had been based on the Extraction Procedure (EP) Toxicity Test (USEPA Method 1310), which specified laboratory steps to be followed in analyzing samples. The test was aimed at identifying the tendency of wastes to generate a leachate with concentrations of contaminants greater than the values listed in Appendix II of the code of Federal Regulations, Part 261.24, page 406, revised Jul. 1, 1988. If concentrations of leachable, mobile chromium were found to be greater than 5 milligrams per liter, the material was considered characteristically toxic for chromium and hence hazardous with respect to chromium content. Such characteristically toxic wastes required treatment to comply with the USEPA regulations defining the treatment standards for chromium and other parameters of concern. This EP Toxicity Test is now obsolete, and has been replaced by the TCLP test for 39 different parameters including chromium.

Effective Nov. 8, 1990, the USEPA established the treatment standard for chromium wastes (D007), and particularly for chromium contaminated soils and solid wastes, at a toxicity characteristic level of 5 milligrams per liter in the extraction fluid according to the TCLP test. The TCLP test is much more rigorous—and is more uniformly applicable to a larger number of parameters—than the EP Toxicity Test. It replaced the EP toxicity method for RCRA waste determination. The TCLP test requires sizing of waste material to less than ⅜ inches or 9.5 mm and agitation of a 100 g waste sample in 2 liters of specified extraction fluid for 18 hours on a rotating agitator at a speed of about 30 revolutions per minute. The chromium concentration is determined in the extraction fluid after filtration under pressure, and expressed in units of milligrams per liter (mg/l).

Chromium occurs in aqueous systems as both the trivalent ($Cr^{+3}$) and the hexavalent ($Cr^{+6}$) ions. Chromium is present in industrial wastes primarily in the hexavalent form, as chromate ($CrO_4^{-2}$) and dichromate ($Cr_2O_7^{-2}$). Chromium compounds are added to cooling water to inhibit corrosion. They are employed in the manufacture of inks and industrial dyes and paint pigments, as well as in chrome tanning, aluminum anodizing, and other metal cleaning, preplating, and electroplating operations. Chromates are also contained in some preservatives and fire-retardant chemicals used in wood preservative treatments. Automobile parts manufacturers are one of the largest producers of chromium-plated metal parts. Frequently the major source of waste chromium is the chromic acid bath and rinsewater used in such metal-plating operations. Reduction of hexavalent chromium from a valence state of plus six to plus three, and subsequent hydroxide precipitation of the trivalent chromic ion, is the most common method of hexavalent chromium control. To meet increasingly stringent effluent standards, some industries have turned to ion exchange to treat chromate and chromic acid wastes. Evaporative recovery of concentrated chromate and chromic acid wastes has also proved technically and economically feasible as a pollution abatement alternative. The application of other processes, such as electrochemical and activated-carbon adsorption techniques, is receiving increasing attention.

U.S. Pat. No. 5,009,793, by Muller relates to the process of metal separation by adjustment of the pH in the range of 3.5 to 11 so that the dissolved metal salts are precipitated as metal hydroxides. The pH adjustment is initially made with an acid and then adjusted with the milk of lime in the presence or absence of hydrogen peroxide as an aid to oxidation and hydroxylation. Under natural conditions, this process is reversible and the precipitated chromium can convert back to hexavalent chrome. In U.S. Pat. No. 5,000,858, Manning and Wells discuss a process for removing hexavalent chromium from water. The process comprises the steps of:

decreasing the pH value to below 3, adding a reducing agent to convert hexavalent chromium to chromic ion, increasing the pH in order to precipitate the metal hydroxide, adding an anionic polymer as a flocculant to settle the trivalent precipitate, and removing the solids to achieve a treatment goal of 0.05 mg/l chromium in the treated water. This process is cumbersome and generates a hazardous solid waste by the TCLP test criteria.

U.S. Pat. No. 4,684,472 by Abbe and Cole relates to the reduction of soluble chromium with sulfide salts to generate a solid precipitate and an aqueous fraction. This method generates a chromium sulfide sludge which under natural environmental conditions due to biological activity can oxidize into chromates and sulfates. In U.S. Pat. No. 3,981,965, Gancy and Wamser discuss a method of treating solid waste material with sulfide ion to convert soluble chromium to an insoluble state. The treatment additives include calcium sulfide, sodium hydrosulfite, dithionates, dithionites, thiourea, thioglycolic acid and sodium xanthates. These reducing compounds convert hexavalent chrome ($Cr^{6+}$) into trivalent chromium ($Cr^{3+}$) and divalent chromium ($Cr^{2+}$) forms which under oxidative conditions may revert back to hexavalent chromium.

U.S. Pat. No. 4,678,584, by Elfine relates to the use of trithiocarbonates, especially $Na_2CS_3$ and $CaCS_3$ to precipitate metals as insoluble sulfides. A mole of trithiocarbonate removes a mole of heavy metal from waste water and forms a metal bearing solid waste and an effluent relatively free of metals. However, under natural environmental conditions these metal sulfides may oxidize, transforming chromates of various metal species into soluble and mobile chromium.

Solidification methods based on Portland cement (see U.S. Pat. No. 4,741,776 to Bye), pozzolans, lime kiln dust, calcium carbonate and powdered lime for chromium fixation are temporary solutions. Furthermore, these methods increase waste volume and mass, and therefore, only dilute the chromium in the final waste matrix. In U.S. Pat. No. 3,201,268, Hemwall discusses the stabilization of soils having lead salts by the addition of phosphoric acid. The use of phosphoric acid alone for chromium fixation of waste media and process materials containing hexavalent chromium does not work because the treated waste fails to pass the TCLP test criteria.

The prior art methods are temporary solutions, generally applicable to waste waters. The need exists for a cost-effective permanent treatment technology which can be applied to solid wastes, precipitated solids, soils, sand, gravel, sludges, waste waters and other waste media containing hexavalent chrome.

SUMMARY OF THE INVENTION

The present invention is a process for the fixation and stabilization of chromium in waste materials comprising the steps of: (a) contacting said waste material in an alkaline aqueous media with a water soluble reducing agent capable of donating electrons in an amount and for a time sufficient to convert a substantial amount of the hexavalent chromium to divalent and trivalent chromium compounds, and (b) contacting the thus treated waste material with a water soluble phosphate source capable of reacting with the divalent and trivalent chromium compounds formed in step (a) in an amount and for a time sufficient to convert a substantial amount of said compounds to non-leachable and stable minerals species, wherein the TCLP-chromium levels are decreased below 5 mg/l.

In some applications an alkalizing agent is added to the aqueous media in step (a) to maintain a pH of at least 7. The quantities of the additives (that is reducing agent, alkalizing agent and phosphate source) vary over a wide range based on several parameters, including: the chemical and mineral composition of the waste material, the amount of hexavalent chromium and other chromium forms in the waste material, the compositions and concentrations of the additives and the specific additives that are used.

The addition of reducing agents like dithionites and ferrous sulfates in an alkaline environment to drive the hexavalent chromium reduction process to completion is an essential prerequisite in the present invention. It results in an end product that passes the TCLP test criteria and the paint filter test used for solid wastes. The waste material generated by this process is readily accepted for disposal by licensed landfills.

DETAILED DESCRIPTION OF A PREFERRED EMBODIMENT

The chrome fixation and stabilization process disclosed herein consists of a series of steps for the treatment of liquid and non-liquid chromium contaminated materials. In the initial step, a soluble reducing agent is used to convert the chromium to divalent and trivalent forms and produce a first waste mixture. The reducing agent in either solution or a powder or crystal form is added in an amount of up to about 30% by weight of the contaminated material and preferably less than about 10% by weight. The amount of reducing agent used depends on the amount and type of chromium, the composition and structure of the waste material and the reactivity of the specific reducing agent selected. A suitable reducing agent is chosen from a group consisting of sodium dithionite or sodium hydrosulfite, ferrous sulfate, sodium sulfite, sodium bisulfite, sodium metabisulfite, sulfur dioxide, sodium sulfide, hydrazine, and mixture of two or more of these reducing agents or other compounds capable of transforming hexavalent chromium into a divalent or trivalent chromic form by donating one or more electrons. Sodium dithionite is the preferred reducing agent for the present process. In order to allow contacting of the reducing agent with the chromium bearing solid or waste material, water may have to be added to waste materials having a low moisture content. For some applications, an amount of water up to about 50% by weight of the waste material being treated is added.

Since the reduction/conversion process is fully reversible and depends to a large extent on the pH and oxidation reduction conditions, it is essential that favorable conditions are created to drive the reduction reaction to completion. This is accomplished by controlling the pH at above 7 by adding an alkalizing agent (base).

In the next step of the process, an alkaline environment with a negative redox potential is created by the addition of an alkalizing agent to form a second waste mixture. This step can also be carried out prior to or at the same time as the addition of the reducing agent. Acceptable alkalizing agents include quicklime, calcium hydroxide, calcium oxide, sodium hydroxide, potassium hydroxide, Dolomite, slaked lime, magnesium hydroxide, magnesium oxide and mixtures consisting of two or more of these alkalizing agents. The alkalizing agent is added to maintain the pH above 7, with a preferred pH range of 9–12. The reduction reaction should be completed within about 72 hours but in some cases it may take up to about a week. The length of time will depend on the type and amount of chromium in the waste material, the alkalinity and structure of the waste material and the amount and concentration of the specific reducing agent used. Lime (that is quicklime, powdered lime or slaked lime) is the preferred alkalizing agent. When the preferred quantities of reducing and alkalizing agents are used, the reduction reaction is completed within about 6 to 12 hours. The alkalizing agent is added in an amount of up to about 15% by weight of the contaminated material and preferably up to about 3% by weight.

The redox reactions are accelerated in the presence of water and alkaline conditions with the corresponding and simultaneous oxidation of the electron source, that is, the reducing agent. If the chromium contaminated soil or waste material is already alkaline, such as concrete, an alkalizing agent may not be needed during the reduction reaction step and the complete reduction of hexavalent chrome is possible with the addition of only a reducing agent.

During the reduction step, the chromic III form ($Cr^{3+}$) is stabilized as chromic hydroxide when the reduction process goes to completion, leaving non-toxic levels of hexavalent chrome in the alkaline mixture. The objective when adding an alkalizing agent is to assure the completion of the reduction reaction and to stabilize the chromic III form as $Cr(OH)_3$ and the chromous II form as $Cr(OH)_2$. Conditions that would reverse this step are those that modify the pH. A pH below 7 or above 12 can destabilize chromic hydroxide and chromous hydroxide resulting in the formation of $Cr^{3+}$, $Cr^{2+}$, $Cr(OH)^{2+}$, $Cr^0$, $Cr_2O_3$, $Cr(OH)_4$, $Cr(OH)^{3-}_6$ and other transient species in different proportions. Also, oxidizing agents can reverse the reduction reaction and change chromic species into chrome under conditions of positive oxidation reduction potential (ORP). Adequate control of the reduction reaction and the pH is therefore essential for the reactions to completed. Inadequate quantities of the reducing agent or the alkalizing agent may increase the time for completion of the reduction reaction, prevent complete hexavalent chromium reduction or result in the reversal of the reaction.

Chromium hydroxides in the colloidal and subcolloidal state are produced by the reduction reaction. These chromium hydroxides are combined with a phosphate source in the final step of the process to fix the chromium in a mineral form and produce the final waste material. The phosphate source is added in an amount of up to about 30% by weight of the chromium contaminated material. In a preferred embodiment, it is added in an amount of up to about 15% by weight of the contaminated material. The amount of the phosphate source used depends on the amount of chromium, the composition and structure of the waste material and the concentration and reactivity of the specific phosphate source. The phosphate source can be a dry crystal or powder or it can be in solution and it is selected from a group consisting of phosphoric acid, trisodium phosphate, triple superphosphate, ammonium phosphate, potassium phosphate, condensed phosphates and mixtures of two or more of these phosphate sources. Phosphoric acid is the preferred phosphate source. The mixture of treated material resulting from the reduction reaction is thoroughly mixed in a pugmill or mixer with an appropriate phosphate source on a continuous basis or in a batch mode. When the waste material being treated is a liquid, it is filtered within about 72 hours after the phosphate source is added and before it is cured. This removes the excess liquid and separates the chromium containing minerals and other solids that have formed. The filtrate is then tested and retreated if necessary, recycled or properly disposed in an environmentally safe manner. The resulting mixture of treated material so created is then staged on a curing pad. The curing permits the mixture to solidify and mineral structures to form while it dries. The drying of the wet material may take about 2 to 5 days depending on weather conditions and other factors that vary from site to site and location to location. The drying process is accelerated by mixing, tilling or agitating.

The addition of the phosphate source results in highly stable and insoluble mineral species being formed by irreversible geochemical reactions that occur fairly rapidly under conditions of ambient temperature, pressure and moisture or humidity. In most cases, the final waste material is sufficiently cured after 72 hours so that at least about 95% of the reactions that form the final mineral structures have been completed. When the preferred amounts of additives are used in this process, the final waste material is sufficiently cured within about 6 hours so that at least about 95% of the reactions have been completed. When the most preferred amounts of the additives are used, the final waste material is sufficiently cured within about 6 hours so that at least about 99% of the reactions have been completed.

The extent and type of mineral species formed as a result of the treatment process vary greatly depending on the composition of the soil or waste materials and the matrices of the minerals, the level of chrome contamination, and the ingredients and the amounts of the various treatment additives used in the different steps of the present process. Several synthetic mineral species are formed including kotchubeite, euchsite, chromitite and mixed calcochroites, callophanite and chromopicotite. Other mixed minerals formed include calcium-chromium phosphates, calcium-potassium-chromium phosphates, potassium-chromium phosphates, calcium-chromium silicates, chromium oxides and chromium hydrates. These final waste materials are geochemically stable and environmentally safe.

The following examples are given by way of illustration only and should not be considered as limitations on this invention.

Example I

Chrome ore tailings were found to exhibit the characteristics of corrosivity (pH near 12.0) and toxicity for chromium as tested by the TCLP regulatory test criteria. Samples contained nearly 2% total chromium and 84 to 91 mg/l of TCLP chromium when tested using extraction fluid II as described in the latest toxicity test procedure; USEPA Method 1311, SW-846. Approximately 500 g of this hazardous waste material was mixed with 30 g of sodium dithionite ($Na_2S_2O_4$) and 100 ml of water to facilitate the chromate reduction to trivalent chromic form. Since the waste material was highly alkaline, no lime was added. Six (6) hours were allowed for completion of the reduction process.

After six (6) hours, 30 ml or 51 g of 85% concentration phosphoric acid were added to the treated waste material and mixed thoroughly. The final mixture was allowed to stand for 4 hours. After this curing period, the treated material was analyzed for TCLP-chromium and no detectable leachable chromium (<0.2 mg/l) was found in the treated material. The pH of the treated material was neutral (pH of about 7) as compared to the highly alkaline untreated sample (pH of about 12). The results are presented below in Table I.

TABLE I

| Sample Description | pH (S.U.) | Eh (mV) | Moisture (%) | Total Cr (mg/kg) | TCLP-Cr (mg/l) |
|---|---|---|---|---|---|
| Untreated | 12 | −285 | 15.7 | 1.98 | 90 |
| Treated | 6.9 | −0.2 | 31.5 | 1.95 | ND (<0.2) |

The table shows the characteristics of the treated and untreated waste material. The treated material had a neutral pH as compared to the highly alkaline untreated material, the oxidation reduction potential (Eh) was almost zero, the moisture content had increased due to the addition of water in the process, the total chromium content was unchanged and the TCLP-chromium content was significantly reduced to a non-toxic level of less than 2 mg/l.

EXAMPLE II

The treatment process was employed on a larger scale in an application of the process of the present invention using two one-cubic yard lots of highly contaminated waste material. One cubic yard lot weighing approximately 1.5 tons was treated with 210 lbs. of sodium dithionite and 70 gallons of water. The pH did not have to be adjusted because of the high alkalinity of the material. After six hours, a test for hexavalent chromium was negative. About 22 gallons or 308 lbs. of 85% concentration phosphoric acid was then added and thoroughly mixed in a Mini-Maxon Mixer to allow the geochemical, irreversible, and permanent fixation of chromium as phosphate mineral species which are highly insoluble under natural environmental conditions. After a curing time of 4 hours, the treated material contained TCLP-chromium below the detection limit of 0.2 mg/l.

Tests after 49 hours, 1 week and 1 month of the completion of the treatment showed that the TCLP-chromium in the treated sample was less than 0.1 mg/l as compared to an average of 54 mg/l in two untreated samples.

Example III

A sand-like material containing 7287 mg/kg of total chromium and 26.2 mg/l of TCLP-chromium was obtained for treatment according to the process of the present invention. Approximately 500 g of this hazardous material was mixed with 10 g of sodium dithionite and 50 ml of water and then 2 g of lime was added and mixed thoroughly. This mixture was allowed to stand and cure overnight (approximately 12 hrs.). Twenty-five ml of 25% phosphoric acid reagent (that is 6.25 ml of phosphoric acid by volume in 18.75 ml of water or 10.6 g of phosphoric acid by weight in 18.75 g of water) was added and blended thoroughly. The treated material was cured for four hours to irreversibly fix any leachable chromium in the phosphate mineral species. The TCLP-chromium in the treated material was 0.3 mg/l, well below the regulatory threshold limit of 5 mg/l for materials to be classified as non-hazardous waste.

EXAMPLE IV

A chromium contaminated clay sample containing 342 mg/l of TCLP-chromium and 9850 mg/kg of total chromium was treated as follows:

Step I: about 20 grams of sodium dithionite, $Na_2S_2O_4$, by weight along with 200 ml of water were mixed with 1000 grams of the contaminated clay, Step II: about 5 grams of lime were added and mixed with the contaminated clay, Step III: after 12 hours, 34 grams of phosphoric acid by weight was mixed with the contaminated clay for permanent fixation and generation of highly stable and insoluble phosphate mineral species.

After curing for 4 hours, the TCLP-chromium in the treated clay sample was reduced to 2.4 mg/l which is roughly half the regulatory threshold limit of 5 mg/l

EXAMPLE V

An in-situ, 12 ft.×12 ft.×1 ft. test plot containing clay soil and sludge contaminated with 70.4 mg/l of TCLP chromium were treated by the process of the present invention. The volume of the test plot was approximately 144 cu ft. or 5.33 cu yds. About 114 kg of sodium dithionite ($Na_2S_2O_4$) in solution was added and mixed with the help of a rototiller. Since the clay soil and sludge were saturated with water due to rain, no extra water was needed. After 30 minutes, about 45.5 kg of lime was spread over the test plot and mixed thoroughly with the help of the rototiller. The treated soil was allowed to cure for 10 to 12 hours in order to allow complete reduction of the hexavalent chrome to the divalent chromous ($Cr^{2+}$) and trivalent chromic ($Cr^{3+}$) forms.

After the treated soil had cured, approximately 41 gallons (or 574 lbs.) of an 85% concentration of phosphoric acid was pumped over the test plot and blended thoroughly. The treated material was allowed to cure and after 4 hours, it was tested and found to have TCLP-chromium levels below 0.34 mg/l.

Results of five test runs are summarized in Table II below:

TABLE II

| In-situ Application of Treatment Process To Heavy Clay Soils For Fixation of Leachable Chromium | | |
|---|---|---|
| Test Run | TCLP-Chromium | |
| | Untreated, mg/l | Treated, mg/l |
| I | 70.4 | 0.11 |
| II | 115.9 | 0.07 |
| III | 161.4 | 0.2 |
| IV | 110.1 | 0.3 |
| V | 125.6 | 0.1 |

EXAMPLE VI

An alkaline soil sample (pH of about 11) containing a measured value of nearly 4600 mg/kg of total chromium and a TCLP-chromium value of 138 mg/l was treated using the process of this invention for chemical fixation and stabilization of leachable chromium. Approximately 100 g of the hazardous soil sample was treated as follows:

(a) 3 g sodium dithionite ($Na_2S_2O_4$) in solution were added and mixed and allowed to cure for 9 hours (lime was not needed because the sample was highly alkaline), and (b) 25 ml of 20% phosphoric acid (i.e., 5 ml or 8.5 g phosphoric acid and 20 ml of water) were added and mixed thoroughly. This final mixture was allowed to cure for 3 hours.

The treated sample was rendered non-hazardous as the TCLP-chromium levels decreased to below the detection limit of 0.2 mg/l.

What we claim is:

1. A process for the fixation and stabilization of hexavalent chromium contained in a waste material consisting essentially of the steps of:
    (a) contacting said waste material in an alkaline aqueous media with a water soluble reducing agent capable of donating electrons in an amount and for a time sufficient to convert a substantial amount of the hexavalent chromium to divalent and trivalent chromium compounds, wherein an alkalizing agent is added to the aqueous media in step (a) in an amount sufficient to maintain a pH of at least 7,
    (b) contacting the thus treated waste material with a water soluble phosphate source capable of reacting with the divalent and trivalent chromium compounds formed in step (a) in an amount and for a time sufficient to fix a substantial amount of said compounds in a non-leachable and stable phosphate mineral species, and (c) curing said phosphate mineral species until the leachable chromium levels are below 5 mg/l as determined by the Toxicity Characteristic Leaching Procedure (TCLP) (USEPA) Method 1311.

2. The process of claim 1, wherein the reducing agent is selected from the group consisting of sodium hydrosulfite or sodium dithionite, ferrous sulfate, sodium sulfite, sodium bisulfite, sodium metabisulfite, sulfur dioxide, sodium sulfide and mixtures containing two or more of these reducing agents.

3. The process of claim 2, wherein the reducing agent is a solution.

4. The process of claim 2, wherein the reducing agent is a powder.

5. The process of claim 2, wherein the reducing agent is in a crystal form.

6. The process of claim 1 wherein the alkalizing agent is selected from the group consisting of quicklime, calcium hydroxide, calcium oxide, slaked lime, magnesium oxide, magnesium hydroxide, potassium hydroxide, sodium hydroxide and mixtures containing two or more of these alkalizing agents.

7. The process of claim 1, 2 or 6 wherein the phosphate source is selected from the group consisting of phosphoric acid, mono-, di- and tri-basic phosphates, pyrophosphoric acid, pyrophosphates and mixtures containing two or more of these phosphate sources.

8. The process of claim 7, wherein the phosphate source is a solution.

9. The process of claim 7, wherein the phosphate source is a powder.

10. The process of claim 7, wherein the phosphate source is a dry crystal form.

11. The process of claim 1, wherein the waste material containing hexavalent chromium is a soil.

12. The process of claim 1, wherein the waste material containing hexavalent chromium is a sludge.

13. The process of claim 1, wherein the waste material containing hexavalent chromium is a waste water.

14. A process for the fixation and stabilization of hexavalent chromium contained in a waste material consisting essentially of the steps of:
    (a) contacting said waste material in an alkaline aqueous media with sodium dithionite in an amount and for a time sufficient to convert a substantial amount of the hexavalent chromium to divalent and trivalent chromium compounds, wherein an alkalizing agent is added to the aqueous media in step (a) in an amount sufficient to maintain a pH of at least 7,
    (b) contacting the thus treated waste material with phosphoric acid in an amount and for a time sufficient to fix a substantial amount of said divalent and trivalent chromium compounds in a non-leachable phosphate mineral species, and (c) curing said phosphate mineral species until the leachable chromium levels are below 5 mg/l as determined by the Toxicity Characteristic Leaching Procedure (TCLP) (USEPA) Method 1311.

15. The process of claim 14, wherein the alkalizing agent is lime.

* * * * *